United States Patent [19]
Payne et al.

[11] Patent Number: 5,020,355
[45] Date of Patent: Jun. 4, 1991

[54] METHOD AND APPARATUS FOR SECURING FIRST AND SECOND MEMBERS

[76] Inventors: Roy D. Payne, 4711 Fountainhead Dr., Houston, Tex. 77066; Mark A. Lammon, 112 Tree Crest Cir., The Woodlands, Tex. 77381

[21] Appl. No.: 443,912

[22] Filed: Nov. 30, 1989

[51] Int. Cl.$^5$ .......................... B21D 9/08; B21F 15/04
[52] U.S. Cl. ..................................... 72/407; 72/410; 140/57; 140/93 D; 29/243.56
[58] Field of Search .......................... 72/407, 410, 452; 29/816, 818, 505, 521, 513, 525.1, 243.56; 140/57, 53, 56, 93 D; 53/138 A

[56] References Cited

U.S. PATENT DOCUMENTS

| | | | |
|---|---|---|---|
| 2,174,152 | 9/1939 | Curtiss . | |
| 2,214,840 | 10/1940 | Hill . | |
| 2,605,467 | 8/1952 | Lind | 72/407 |
| 3,026,520 | 3/1962 | Albrecht | 72/407 |
| 3,133,288 | 5/1964 | Ohgren | 72/407 |
| 3,160,890 | 12/1964 | Lefebvre | 72/407 |
| 3,477,351 | 11/1969 | Funk . | |
| 3,628,230 | 12/1971 | Grise | 29/816 |
| 3,810,495 | 5/1974 | Pack | 72/407 |
| 3,945,238 | 3/1976 | Eckert | 29/243.56 |
| 4,003,118 | 1/1977 | Jensen | 29/243.56 |
| 4,388,791 | 6/1983 | Anderson | 52/719 |
| 4,798,231 | 1/1989 | Glaus | 140/57 |
| 4,834,148 | 5/1989 | Muguruma | 140/57 |

FOREIGN PATENT DOCUMENTS 1134015  7/1962  Fed. Rep. of Germany ... 53/138 A

Primary Examiner—Daniel C. Crane
Attorney, Agent, or Firm—Vaden, Eickenroht, Thompson & Boulware

[57] ABSTRACT

Method and apparatus for securing a fastener around two members, the jaws of which are initially retracted to allow loading of a fastener from a magazine, cassette, clip, or cartridge into the jaws. A piston is then moved into engagement with the jaws, which capture the fastener, shearing the fastener from the magazine, to move the fastener into position over the two members around which the fastener is to be secured. A ram is positioned against the fastener to hold the fastener against the members and to facilitate bending of the fastener at desired points to conform the fastener to the shape of the members. The jaws then close around the members, bending the fastener, as the piston continues downward movement. The piston is then moved in the opposite direction to first allow the jaws to return to the open position and then to retract the jaws to allow loading of a second fastener.

19 Claims, 4 Drawing Sheets

METHOD AND APPARATUS FOR SECURING FIRST AND SECOND MEMBERS

BACKGROUND OF THE INVENTION

The present invention relates to a method and apparatus for applying a ring fastener to, for instance, secure a first member to a second member at the point at which the first and second members touch or cross. More particularly, the present invention relates to a method and apparatus for securing first and second members to each other in instances in which the members are difficult to access as, for instance, in the tying of reinforcing steel.

A number of so-called automatic staple guns, hog ring applicators, and devices for applying fasteners are known in the patent literature (see, for instance, U.S. Pat. Nos. 2,174,152, 2,217,840, 3,628,230, 3,810,495, 3,945,238, and 4,003,118). However, for various reasons, the devices described in these patents have not solved the problems of applying a fastener or clip to secure two members to each other in certain applications. For instance, one application which has been problematical is in the tying of the reinforcing steel in concrete walls, columns, piers, mats, slabs, beams, roadway, and paving.

An illustration of the type of problems encountered is provided by a description of the tying of reinforcing steel in concrete roadway. Because such reinforcing steel generally rests on a roadbed, e.g., gravel, dirt, or other surface, the two reinforcing bars to be tied to each other must be lifted up off of that surface so that a wire can be wrapped around the two bars. These operations are generally accomplished manually and are slow and exhausting and therefore, labor intensive. Some specific disadvantages of this method are summarized in the background section of U.S. Pat. No. 3,810,495. Further, the repetitive nature of those operations (e.g., tying every second intersection over a ten mile stretch of highway pavement makes for thousands of ties) gives rise to repetitive trauma disorders such as carpal tunnel syndrome, causing lost work time and production as well as the possibility of permanent physical disability to the worker.

As evidenced by the above-referenced U.S. Pat. No. 3,810,495, the problems associated with the tying of reinforcing steel have been recognized before. Additionally, U.S. Pat. No. 3,477,351 describes a bar tying machine which raises up individual longitudinal bars and applies ties at selected intersections of that bar with a transverse bar. On information and belief, however, the device described in that patent has not found widespread acceptance in the industry, perhaps because of the complexity, and consequent unreliability and cost, of the device.

Another approach to solving these problems, disclosed in U.S. Pat. No. 4,388,791, is to modify the tie used to secure the reinforcing bars at their intersection. That patent describes a U-shaped resilient wire, or clip, the legs of which are bent into a J-shaped configuration when viewed from the side. According to that patent, the clip can be positioned and secured with one hand by a worker who can support the bars with the other hand. Also on information and belief, this device has not been widely utilized in the industry, possibly because it still requires that the bars be lifted up off of the surface on which they rest to allow application of the clip. Further, it is often necessary to remove or adjust a tie after it has been applied, e.g., when improperly placed. In spite of the teaching of resiliency in that patent, such clips must be quite rigid to provide the necessary strength to the connection, and that rigidity makes the clip difficult to remove and/or adjust.

It appears, therefore, that there is still a need for a reliable, low cost device for applying ties or other types of fastener to concrete reinforcing steel and that such a device would be more likely to be considered to solve this problem if it could apply the fastener without requiring that the bars be lifted. In other words, a device is needed which can (a) transport a fastener or clip down around the two bars, (b) "dig" down into the dirt, gravel, or other strata on which the bars rest to apply the fastener around the bars, and (c) retract or otherwise accommodate rapid reloading of another fastener for transport downwardly at the next intersection of two bars. Further, the device needs to be reliable, durable, and adaptable for being powered with a powder charge or with electric, hydraulic, pneumatic, or manual power. It is, therefore, an object of the present invention to provide (1) an apparatus which has all these operating characteristics, (2) a method which is capable of being utilized with an apparatus having these characteristics, and (3) a fastener capable of being used in connection with such an apparatus and method.

Such an apparatus, method, and fastener would have widespread application for tying reinforcing steel in walls, piers, slabs, columns, roadway, and other concrete structures and, outside of the concrete and/or construction industry, in applications such as the upholstery and fencing industries, and in any other application in which two members which cross or touch each other need to be secured to each other. Other objects, and the advantages of the present invention, will be made clear from the following description of presently preferred embodiments of a method practiced and an apparatus constructed in accordance therewith.

SUMMARY OF THE INVENTION

These objects are achieved by providing an apparatus for securing a first member to a second member comprising a pair of jaws, each of the jaws being mounted to a pivot point, and means for loading a fastener into the jaws. Means is provided for moving the pivot points of the jaws from a first position in which the jaws receive a fastener from the loading means to a second position in which the jaws are pivoted on the pivot points to bend the fastener loaded therein around a first and a second member. Means is also provided for engaging the fastener while the fastener is being bent by the pivoting of the jaws to resist movement of the fastener away from the first and second members, causing the fastener to conform to the shape of the first and second members as the fastener bends, to tightly secure the fastener to the first and second members.

The fastener loading means preferably takes the form of a cartridge, magazine, or cassette loaded with the fasteners under spring tension such that individual fasteners are urged into the jaws. The moving means preferably comprises a piston mounted within a chamber in a housing in which the jaws are also mounted and having a beveled surface formed therein that is movable between a first position allowing a fastener to enter the housing for loading into the jaws and a second position for engaging the jaws to move the pivot points thereof from first to second positions and to pivot the jaws. The fastener engaging means is preferably a ram which selectively engages the fastener when the pivot points of the jaws are in the second position, e.g., while the fastener is being bent, and is conveniently mounted to the moving means.

In another aspect, the apparatus of the present invention is adapted for securing two members, such as two concrete reinforcing bars, to each other comprising an elongate housing having a chamber therein with openings in the side wall and the end thereof having a piston mounted therein that is movable from a first position in which the opening in the side wall is uncovered for passing a fastener into the chamber and a second position in which the fastener is bent to secure the two crossing members to each other. A pair of jaws pivotable between first, open and second, closed positions are also mounted in the chamber and are shaped to receive a fastener through the opening in the side wall of the housing and to carry the fastener when the jaws are moved within the chamber when in the first, open position. The piston is provided with a bevel for bearing against the jaws to first move the jaws, having the fastener carried therewith, out of the chamber and then pivot the jaws to the second, closed position around the two members, thereby bending the fastener, as the piston is moved from the first to the second position. The piston is also provided with means for resisting movement of the fastener away from the two members as the jaws pivot from the first, open to the second, closed position to cause the fastener to conform to the shape of the two members as the jaws bend the fastener.

In another aspect of the present invention, there is provided a method for securing a first member to a second member comprising the steps of loading a fastener into a pair of pivoting jaws mounted within the chamber of a housing and then moving the jaws, having the fastener loaded therein, out of the housing. The jaws are moved out of the housing by moving a piston having a beveled shoulder formed therein for bearing against the jaws and which is mounted within the chamber in the housing from a first position for loading the fastener to a second position engaging the jaws, the beveled shoulder causing the pivot points of the jaws to slide within the housing so that the jaws pivot out of the housing around a first and a second member to bend the fastener. As the fastener bends, movement of the fastener away from the first and second members is resisted to tightly secure the fastener around the first and second members by conforming the fastener to the shape of the first and second members.

In still another aspect, the present invention provides a fastener for tying reinforcing steel comprising a wire bent into a generally triangular shape having one open side for receiving reinforcing bars therethrough, the opposing ends of the wire on the open side of the triangle having surfaces beveled in opposite directions so that, when the open triangle is closed around the bars received therein by bending the wire around the bars, the opposing ends contact each other and deflect past each other. Locking means is formed in the wire immediately behind the bevel on the opposing ends of the wire for interacting to retain the wire in a closed, overlapped oval, the deflection causing the wire to be deformed in a manner in which torsional resistance insures the continued engagement of the locking means on opposing ends of the wire.

BRIEF DESCRIPTION OF THE DRAWINGS

FIG. 3 is a longitudinal, sectional view of the apparatus of FIG. 4 showing the apparatus as the fastener of FIG. 1 is being applied to the two members of FIG. 3.

DETAILED DESCRIPTION OF PREFERRED EMBODIMENTS

Figure 1:
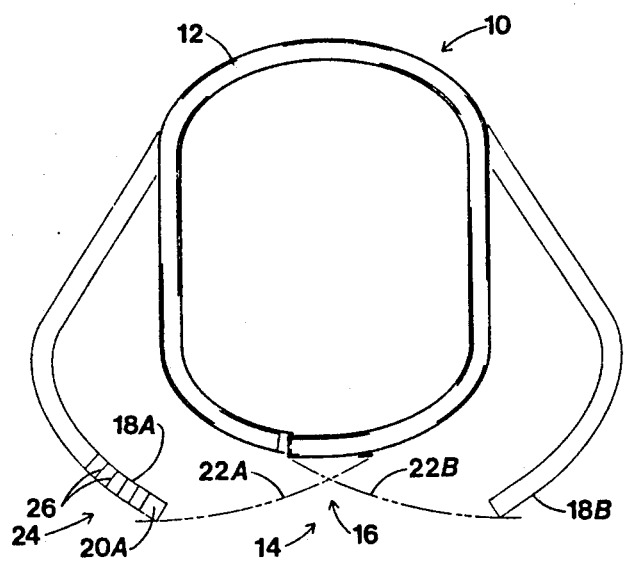
FIG. 1 is a plan view of a presently preferred embodiment of a fastener constructed in accordance with the present invention.
Figure 2:
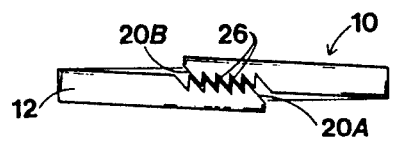
FIG. 2 is a side view of the fastener of FIG. 1 after the fastener has been bent to deform the wire so that the ends thereof are interlocked.

Referring first to FIGS. 1 and 2, there is shown a fastener, indicated generally at reference numeral 10, for tying reinforcing steel. Fastener 10 is comprised of a wire 12 bent in a generally triangular shape having one open side 14 for receiving reinforcing steel (not shown) through the opening 16. The opposing ends 18A and 18B of wire 12 on the open side 14 of the triangle are provided with beveled surfaces 20A and 20B, respectively, the surfaces 20A and 20B being beveled in opposite directions, so that when the open side 14 of the triangle is closed around the reinforcing steel received therein by bending the wire in the directions shown by arrows 22A and 22B, the opposing ends 18A and 18B contact each other and deflect past each other as best shown in FIG. 2. Immediately behind the beveled surfaces 20A and 20B on the opposing ends 18A and 18B of wire 12, a locking means, indicated generally at reference numeral 24, is formed in wire 12. Locking means 24 preferably takes the form of one or more serrations, or teeth, 26 formed in the overlapping surfaces, e.g., the sides, of the wire 12 for interacting to retain the wire 12 in a closed, overlapped oval. When bent in this manner, wire 12 is deformed in a manner in which the torsional resistance to that bending insures that the teeth 26 of the two opposing ends 18A and 18B thereof are maintained in contact with each other.

Figure 3:
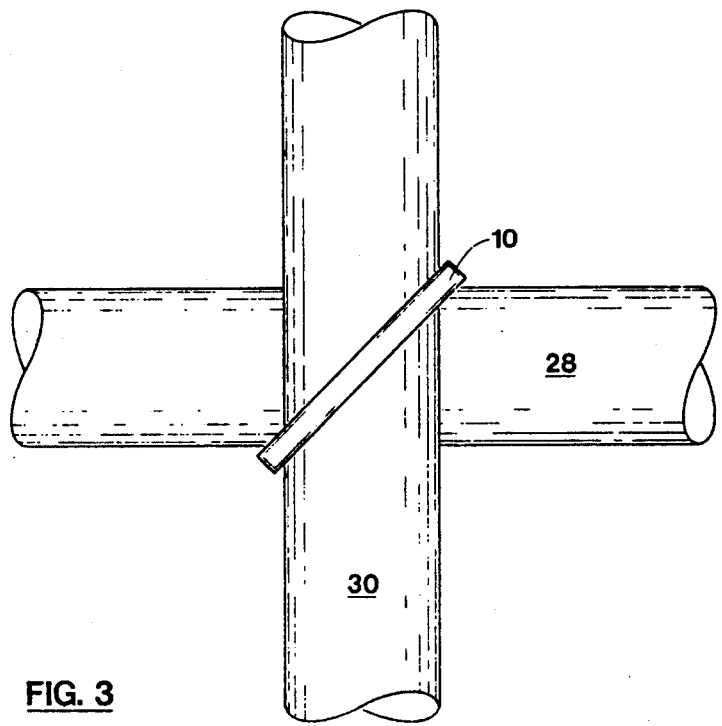
FIG. 3 is a plan view of the fastener of FIG. 1 as applied to two members to secure the two members to each other.

As shown in FIG. 3, fastener 10 is used to advantage to tie two reinforcing bars 28 and 30 which cross each other. Although used to advantage in this manner, it will also be understood by those skilled in the art who have to benefit of this disclosure that fastener 10 can be used to advantage with other members which cross and that bars 28 and 30 need not cross at right angles to be tied by fastener 10. Further, the bars 28 and 30 do not even need to cross each other to be capable of being secured to each other using fastener 10; all that is necessary is that two members be closely approximated to each other or touch each other so that the two members can be received within fastener 10 through the opening 16 in the open side 14 thereof and that fastener 10 then be closed around the two members by bending the opposing ends 18A and 18B of wire 12 in the direction of arrows 22A and 22B until the locking means 24 causes wire 12 to be retained therearound.

An apparatus for securing a first member, such as reinforcing bar 28, to a second member such as reinforcing bar 30 is indicated generally at reference numeral 32 in FIGS. 4-9. Apparatus 32 is comprised of a pair of pivoting jaws 34A and 34B, each of the jaws 34A and 34B being mounted to a pivot point 36A and 36B, respectively, in a chamber 38 (best shown in FIG. 9) in an elongate housing 40. Housing 40 is provided with an opening 42 in one end thereof for a purpose to be made clear below and means, indicated generally at reference numeral 44, for loading a fastener such as the fastener 10 in the jaws 34A and 34B, the loading means 44 including an opening 46 in the side wall 48.

Figure 4:
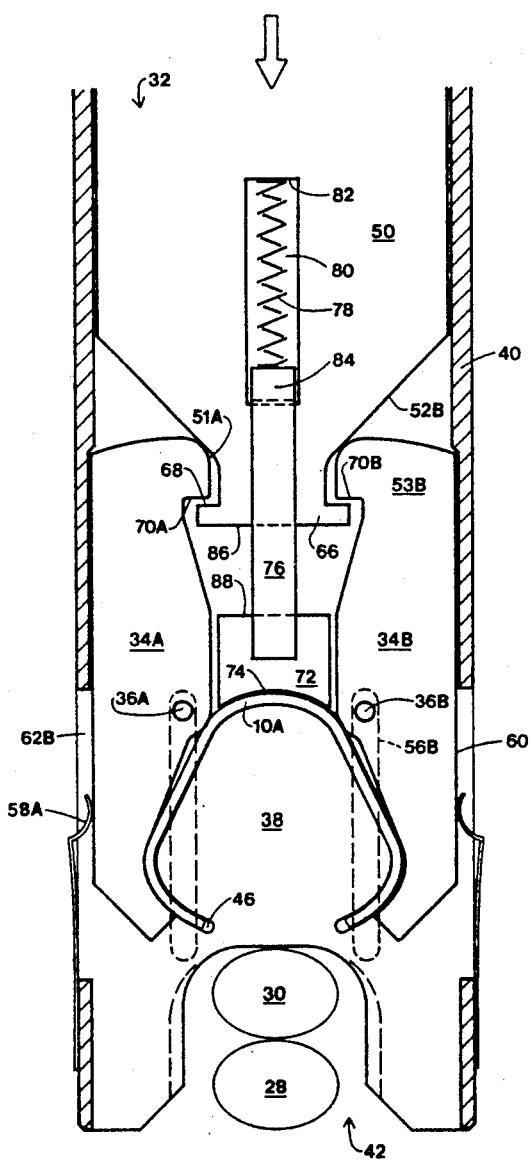
FIG. 4 is a longitudinal, sectional view of a presently preferred embodiment of an apparatus for securing a first member to a second member that is constructed in accordance with the present invention.
Figures 6, 7:
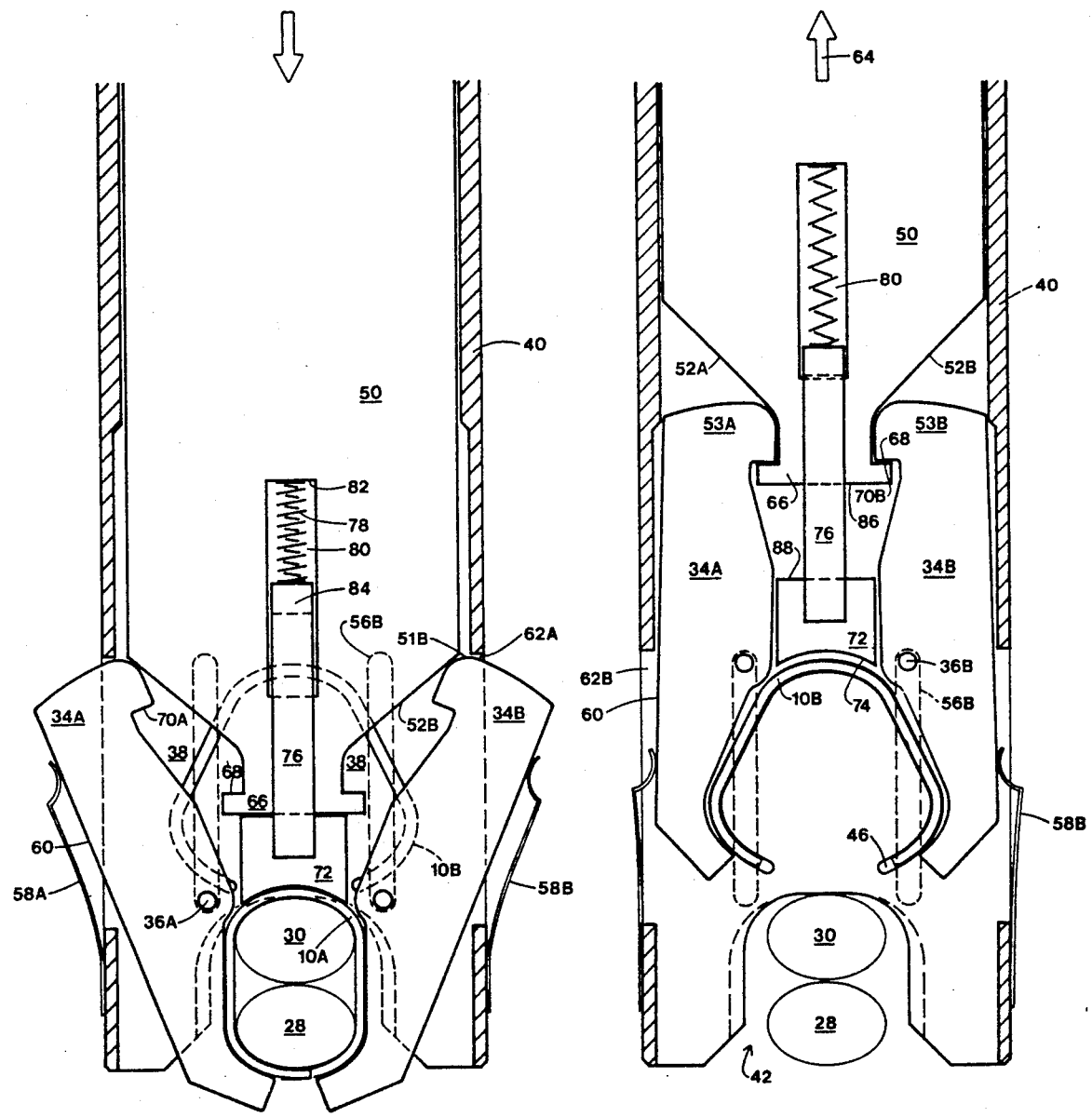
FIG. 7 is a longitudinal, sectional view of the apparatus of FIG. 4 showing the apparatus after the fastener of FIG. 1 has been applied to the two members of FIG. 3.

Also mounted within housing 40 is a means for moving the pivot points 36A and 36B from a first, open position shown in FIG. 4, in which jaws 34A and 34B receive fastener 10 (numbered 10A in FIG. 4 for reasons to be clarified below) from loading means 44 to a second, closed position shown in FIG. 6, in which jaws 34A and 34B are pivoted on pivot points 36A and 36B to bend the fastener 10A loaded therein around a first and second member, e.g., bars 28 and 30. Jaws 34A and 34B are shaped to receive fastener 10A as the fastener 10A passes through opening 46 into chamber 38 and to carry fastener 10A when moved within chamber 38 in the first, open position.

In the preferred embodiment shown in FIGS. 4-9, the pivot point moving means takes the form of a piston 50 mounted in the chamber 38 in housing 40 which is movable from a first position, shown in FIG. 4, in which the opening 46 in the side wall 48 of housing 40 is uncovered for passing fastener 10A therethrough into chamber 38, to a second position shown in FIG. 6, in which fastener 10A is bent to secure the two members 28 and 30 to each other. Piston 50 is provided with beveled shoulders 52A and 52B which serve as bearing surfaces for first engaging the bearing surfaces 51A and 51B of the respective jaws 34A and 34B to move jaws 34A and 34B, having the fastener 10A carried therewith, out of chamber 38 and then for pivoting jaws 34A and 34B on pivot points 36A and 36B to the second, closed position around the two members 28 and 30 to bend fastener 10A as piston 50 is moved from the first to the second position.

Figure 5:
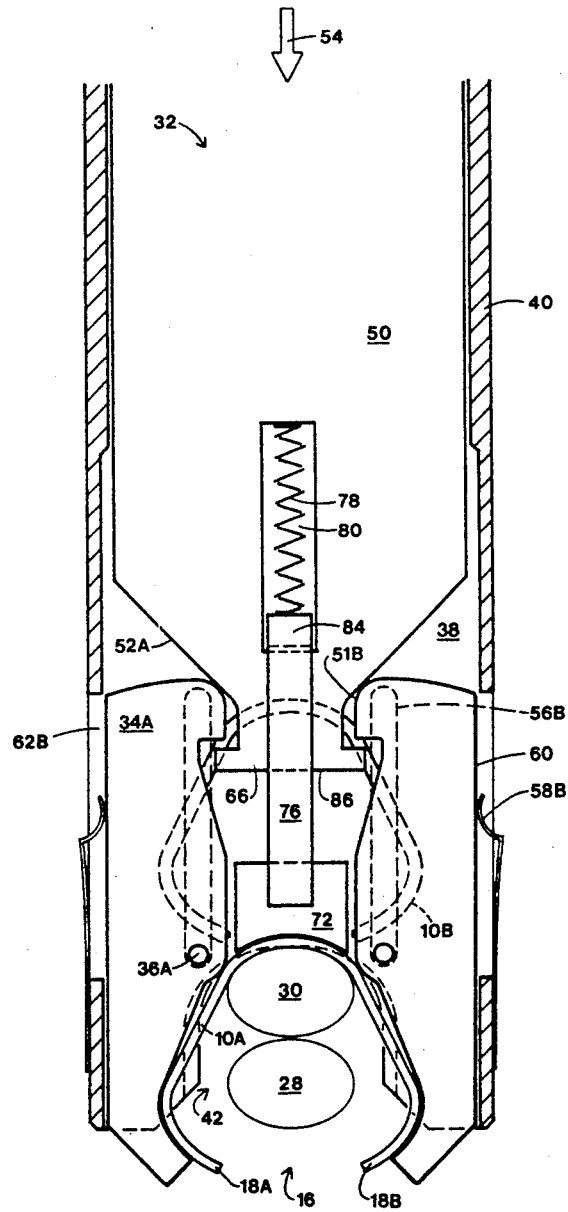
FIG. 5 is a longitudinal, sectional view of the apparatus of FIG. 4 showing the apparatus in the process of applying the fastener of FIG. 1 to the two members of FIG. 3.

As shown in FIG. 5, when the bearing surfaces 51A and 51B of the respective tops 53A and 53B of jaws 34A and 34B are engaged by the beveled shoulders 52A and 52B of piston 50, jaws 34A and 34B are moved in the direction of arrow 54, the pivot points 36A and 36B sliding in the grooves 56A and 56B (see FIG. 9) milled in the side wall 48 of housing 40. The tops 53A and 53B of jaws 34A and 34B are initially confined by the housing 40 and the action of leaf springs 58A and 58B affixed to the housing 40 and bearing against the edge 60 of jaws 34A and 34B. Housing 40 is provided with openings 62A and 62B through which the respective leaf springs 58A and 58B extend and through which the tops 53A and 53B of jaws 34A and 34B are forced by the beveled shoulders 52A and 52B upon continued movement of the piston 50 to the point at which the pivot points 36A and 36B bottom out in grooves 56A and 56B, e.g., when the pivot points 36A and 36B reach the second position. When the tops 53A and 53B of jaws 34A and 34B are forced out of housing 40 in this manner, jaws 34A and 34B are pivoted to the second, closed position shown in FIG. 6.

Leaf springs 58A and 58B bias the respective jaws 34A and 34B back into the housing 40 so that, as piston 50 is moved in the direction of arrow 64 (see FIG. 7), the jaws 34A and 34B return to the first open position (see FIG. 5). Piston 50 is provided with means for engaging jaws 34A and 34B to move the pivot points 36A and 36B back to their first position shown in FIG. 4 in the form of a T-head 66, the underside 68 of which engages the bearing surfaces 70A and 70B of jaws 34A and 34B as piston 50 continues to move in the direction of arrow 64 until the pivot points 36A and 36B of jaws 34A and 34B reach the full extent of travel in the respective grooves 56A and 56B, e.g., the point at which the opening 46 is uncovered to allow the next fastener 10B (see FIG. 7) contained in loading means 44 to pass therethrough.

The apparatus 32 is also provided with a means for engaging a fastener 10 while the fastener 10 is being bent by the pivoting of jaws 34 to resist movement of fastener 10 away from first and second members 28 and 30 in the form of ram 72 which moves with the pivot points 36A and 36B of the respective jaws 34A and 34B between the first and second positions shown in FIGS. 4 and 5. Movement of ram 72 with pivot points 36A and 36B is preferably accomplished by mounting ram 72 on piston 50 so that, as piston 50 is moved from first position to second position, the curved surface 74 of ram 72, which is shaped to receive fastener 10 and to cooperate with jaws 34A and 34B to carry the fastener 10 when jaws 34A and 34B are in their first, open position, engages the fastener 10. Ram 72 is preferably mounted to piston 50 on the end of a bracket 76 so that ram 72 is carried on piston 50 ahead of T-head 66 as piston 50 is moved in the direction of arrow 54 (see FIG. 5), e.g., as piston 50 is moved from the first position to the second position. In this manner, fastener 10A is effectively trapped against the top surface of second member 30 (as shown in FIGS. 5 and 6) so that, as fastener 10A is bent by the pivoting of jaws 34A and 34B to the second, closed position, fastener 10A is caused to conform to the shape of the two members 28 and 30 because the bending of fastener 10A occurs around the top surface of second member 30 in a manner similar to the manner in which wire is bent in a wire bending jig.

In the presently preferred embodiment shown in FIGS. 4-9, piston 50 is provided with means for biasing ram 72 away from piston 50 toward the opening 42 in the end of housing 40 whereby movement of piston 50 toward the second position shown in FIG. 6 increases the resistance to movement of fastener 10A exerted by ram 72 as fastener 10A is bent by the pivoting of jaws 34A and 34B. This biasing means takes the form of a spring 78 mounted in a slot 80 in piston 50 which is trapped between the end 82 of slot 80 and the slide 84 which forms a portion of bracket 76. When constructed in this manner, the curved surface 74 of ram 72 holds fastener 10A to the top surface of second member 30 even while piston 50 completes movement from first position to second position, decreasing the likelihood of misalignment of jaws 34A and 34B with fastener 10A, and is then joined in resisting movement of fastener 10A away from second member 30 as the fastener 10A is bent by engagement of the top surface 86 of T-head 66 bearing against the shoulder 88 formed by the joint between bracket 76 and ram 72 as shown in FIG. 6.

Figure 8:
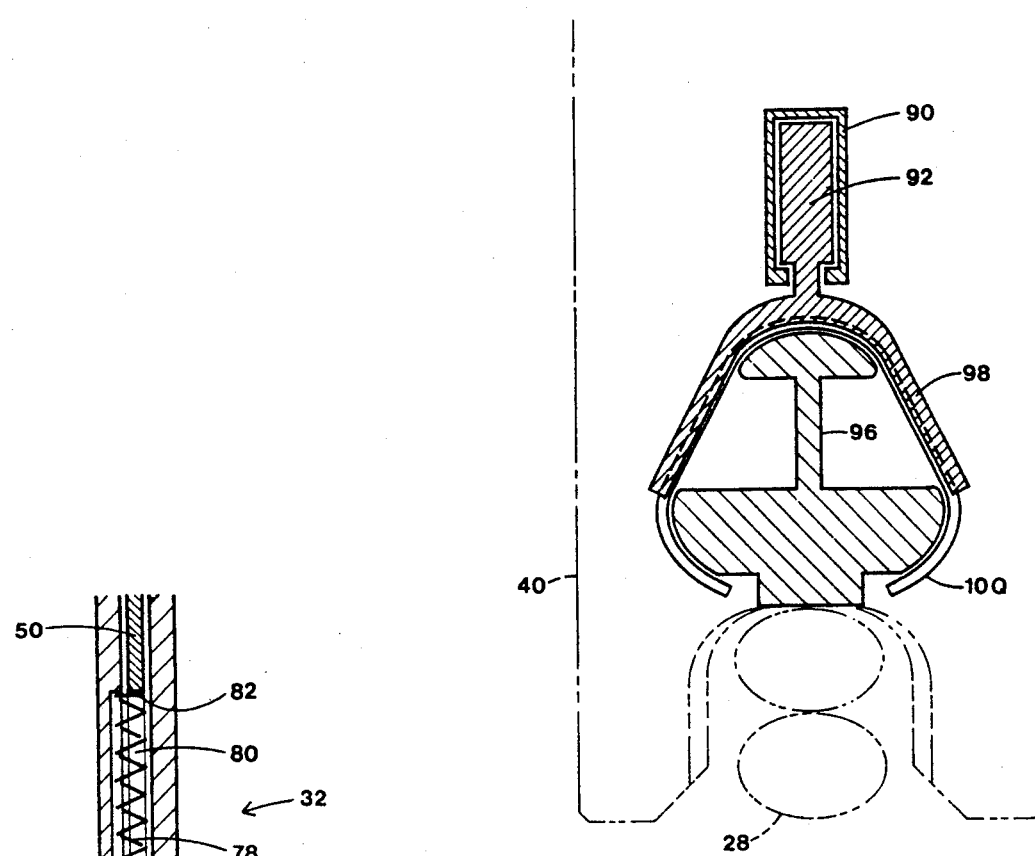
FIG. 8 is a sectional view of the apparatus of FIG. 4 taken along the lines 8—8 in FIG. 9.
Figure 9:
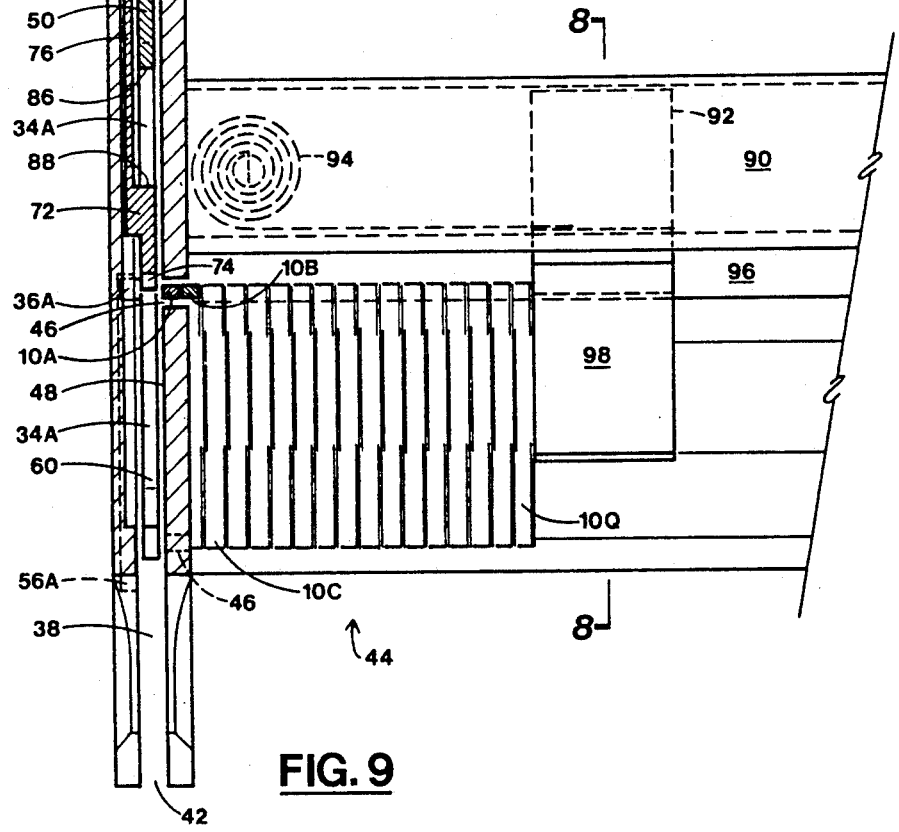
FIG. 9 is a partial sectional view of the apparatus of FIG. 4, the section being taken through the housing thereof, showing the fastener loading mechanism in elevated side view.

Referring now to FIGS. 8 and 9, there is shown a presently preferred embodiment of the fastener loading means 44. Fastener loading means 44 is affixed and/or integral with housing 44 and comprises a cover 90 which serves as a rail for carriage 92 and a mount for spiral spring 94 which is affixed to carriage 92 for biasing carriage 92 toward housing 40. A plurality of fasteners 10A–10Q are carried on rail 96, which is shaped to maintain fasteners 10A–10Q in alignment thereon, the integral slide 98 of carriage 92 urging fasteners 10A–10Q through the opening 46 in the side wall 48 of housing 40 into chamber 38 under the influence of spiral spring 94.

Having described the presently preferred embodiment of the apparatus of the present invention, a method practiced in accordance with the present invention will now be described with reference to that preferred embodiment. The method of securing a first member to a second member, such as the reinforcing bars 28 and 30, comprises the first step of loading a fastener such as fastener 10A into the pivoting jaws 34, the jaws 34 being confined within the chamber 38 of housing 40. As described above, that loading is accomplished when piston 50 is moved in the direction of arrow 64 (see FIG. 7) far enough to uncover the opening 46 in the side wall 48 of housing 40, e.g., to the first position of piston 50, at which point the fastener 10A is urged into the chamber 38 and into jaws 34 under the influence of spiral spring 94. The next step (FIG. 4) is the moving of jaws 34, having fastener 10A loaded therein, out of housing 40 by moving the piston 50, having the beveled shoulder 52 formed therein for bearing against the tops 53 of jaws 34 and which is mounted within the chamber 38 in housing 40, from the first position for loading the fastener 10A to a second position engaging jaws 34. The movement of jaws 34 causes the fastener 10A to be sheared from the clip or magazine of fasteners carried on rail 96. When the jaws 34 are engaged by the beveled shoulder 52 of piston 50, and upon continued movement of piston 50 toward the second position, the pivot points 36 of jaws 34 slide in grooves 56 within housing 40 so that jaws 34 pivot out of the housing around first and second members 28 and 30. As described above, that pivoting occurs after the tops 53 of jaws 34 are initially confined within housing 40 (FIG. 5) and then jaws 34 are allowed to swing outwardly through the openings 62 in housing 40 under the influence of the beveled shoulder 52 of piston 50 as the pivot points 36 of jaws 34 slide to pivot jaws 34 (FIG. 6).

The third step in the method is the resisting of movement of fastener 10A away from first and second members 28 and 30 (FIG. 6) to conform the fastener 10A to the shape of first and second members 28 and 30 as fastener 10A bends to tightly secure fastener 10A around first and second members 28 and 30. That resistance is provided by the engagement of fastener 10A by the curved surface 74 of ram 72 mounted to piston 50 and the engagement of the shoulder 88 of ram 72 by the top of T-head 66 formed in piston 50. The method optionally includes the biasing of jaws 34 back into housing 40 so that as piston 50 is moved from the second position to the first position, e.g., in the direction of arrow 64, the beveled shoulder 52 allows the tops 53 of jaws 34 to return to the housing 40 (FIG. 7). That bias is advantageously applied by leaf springs 58 as described above. Once jaws 34 are returned to housing 40, the jaws 34 are engaged by a shoulder 68 formed in piston 50 to slide the pivot points 36 of jaws 34 in the direction of arrow 64 to return the jaws 34, which project out of the opening 42 in the end of housing 40 when pivoted to the second, closed position, into housing 40.

An important advantage to the apparatus 32 is conferred by the carrying of the fastener 10 by jaws 34 from the first, open position, allowing the loading of a fastener 10 therein, through the chamber 38 of elongate housing 40 as the pivot points 36 slide in grooves 56 and jaws 34 pivot to the second, closed position. Transporting the fastener 10 in this manner allows application of the fastener to two members such as the members 28 and 30 which are, for instance, down inside something, e.g., the open squares or rectangles formed by the reinforcing bars around which concrete is to be placed. Similarly, the pivoting of jaws 34 out of housing 40 through opening 42 enables the jaws 34 to penetrate dirt, gravel or other strata on which the rebar rests.

The movement of piston 50 is advantageously adapted for power by mechanical, e.g. hand action, or to hydraulic, pneumatic, or electrical power. Piston 50 can also be moved by use of powder charges incorporated into a magazine of cartridges. Further, especially in the case of a powered apparatus for use in tying reinforcing steel, a safety (not shown) is incorporated into the apparatus. The safety preferably takes the form of an elongate wire which extends into the opening 42 at the end of housing 40 and is pivotally mounted to the outside of housing 40 so that when the wire contacts the members, such as first and second members 28 and 30, to be secured to each other, the top of that wire, which extends through a small hole in the side wall 48 of housing 40 into chamber 38 between piston 50 and the tops 53 of jaws 34, is pivoted out of chamber 38, enabling piston 50 to move from the first position shown in FIG. 4 to the second position shown in FIG. 6 to pivot jaws 34 from open to closed position.

Although described in terms of the above-illustrated preferred embodiments, those skilled in the art who have the benefit of this disclosure will recognize that a number of changes can be made to the construction of those embodiments without departing from the spirit of the present invention. For example, the locking means 24 of fastener 10 is conveniently constructed in accordance with the teachings of U.S. Pat. No. 3,810,495. The fastener loading means 44 of apparatus 32 may take the form of a clip, magazine, cassette or cartridge as shown, for instance, in U.S. Pat. Nos. 2,174,152, 3,628,230, or 3,945,238. The ram 72, instead of being mounted to piston 50, can conveniently be mounted in a blind pocket (not shown) in the side wall 48 of housing 40 which is uncovered as jaws 34 pivot to the second, closed position shown in FIG. 6 so that a spring mounted under ram 72 in that pocket biases ram 72 into chamber 38 and into engagement with the fastener 10. When mounted in a blind pocket in this manner, jaws 34 and ram 72 are provided with oppositely beveled surfaces so that, as jaws 34 return to the first, open position within housing 40, jaws 34 ride up over ram 72, forcing ram 72 back into the blind pocket. Another such modification involves the use of springs (not shown) mounted within chamber 38 for resisting movement of the pivot points 36A and 36B of jaws 34A and 34B from the first position in which the jaws 34A and 34B are open to the second position in which jaws 34A and 34B are closed, e.g., in the direction of arrow 64. Such springs are substituted for T-head 66 and bearing surfaces 70A and 70B on the respective jaws 34A and 34B as a means for moving the jaws 34A and 34B back into the housing 40 to the first, open position. Such changes, and many others, are intended to fall within the scope of the following claims.

We claim:

1. An apparatus for securing a first member to a second member comprising:

a pair of jaws, each of said jaws being mounted to a pivot point so that each jaw pivots about said pivot point;

means for loading a fastener into said jaws;

means for moving the pivot point of said jaws from a first position in which said jaws receive a fastener from said loading means to a second position in which said jaws are pivoted on said pivot point to bend the fastener loaded therein around a first and a second member;

means for engaging the fastener while the fastener is being bent by a pivoting of said jaws to resist movement of the fastener away from the first and second members, causing the fastener to conform to the shape of the first and second members as the fastener bends to tightly secure the fastener to the first and second members; and means for movably biasing the fastener engaging means against the fastener to increase the resistance to movement of the fastener while the fastener is being bent.

2. The apparatus of claim 1 wherein said jaws are mounted in a housing when the pivot point of said jaws is in said first position, the housing having an opening in one end thereof through which said jaws extend when the pivot point of said jaws is moved to said second position.

3. The apparatus of claim 2 wherein said moving means comprises a piston mounted in said housing and having a beveled shoulder thereon for engaging said jaws when said piston is moved from a first position allowing passage of a fastener into said housing for loading into said jaws to a second position for moving the pivot point of said jaws from said first position to said second position and to pivot said jaws.

4. The apparatus of claim 3 wherein said jaws are initially confined by said housing when engaged by the beveled shoulder of said piston to move the pivot point of said jaws from said first to said second position and then pivoted upon continued movement of said piston.

5. The apparatus of claim 4 additionally comprising means for biasing said jaws back into said housing when the pivot point of said jaws is in said second position.

6. The apparatus of claim 5 wherein said piston is provided with means for engaging said jaws to move the pivot point of said jaws from said second position to said first position.

7. The apparatus of claim 1 wherein said fastener engaging means comprises a ram which moves with the pivot point of said jaws between said first and second positions.

8. The apparatus of claim 7 wherein said jaws are enclosed by a housing when the pivot point of said jaws is in said first position, the housing having an opening in one end thereof through which said jaws extend when the pivot point of said jaws is in said second position.

9. The apparatus of claim 8 wherein said moving means comprises a piston mounted in a chamber in said housing and movable between a first position allowing a fastener to enter said housing for loading into said jaws and a second position for engaging said jaws to move the pivot point of said jaws from said first to said second position.

10. An apparatus for securing two members to each other comprising:

an elongate housing having a chamber therein with openings in the side wall and the end wall thereof;

a piston mounted in the chamber in said housing and movable from a first position in which the opening through the side wall of said housing is uncovered for passing a fastener into the chamber and a second position in which the fastener is bent to secure two members to each other;

a pair of jaws pivotable between a first, open and a second, closed position and slidably mounted in the chamber in said housing, said jaws being shaped to receive a fastener as the fastener passes through the opening in the side wall of said housing into the chamber and to carry the fastener away from said opening when said jaws are slidably moved within the chamber when in said first, open position;

a bevel formed in said piston for engaging said jaws to move said jaws, having the fastener carried therewith, out of the chamber through the opening in the end of said housing and then pivoting said jaws, as said piston is moved from said first to said second position, to said second, closed position around the two members to bend the fastener;

a ram mounted on said piston for resisting movement of the fastener away from the two members as said jaws pivot from said fist, open to said second, closed position, causing the fastener to conform to the shape of the two members as said jaws bend the fastener; and mean for biasing said ram relative to and away from said piston toward the opening in the end of said housing whereby movement of said piston toward said second position increases the resistance to movement by the fastener exerted be said ram.

11. The apparatus of claim 10 wherein said ram is slidably mounted to said piston.

12. The apparatus of claim 10 wherein said ram is shaped to receive the fastener and to cooperate with said jaws to carry the fastener when said jaws are in said first, open position as said piston moves from said first to said second position.

13. The apparatus of claim 10 wherein said piston and said ram are provided with bearing surfaces, the bearing surface of said piston contacting the bearing surface of said ram when said piston is in said second position.

14. The apparatus of claim 10 wherein said housing is provided with means for biasing said jaws toward said first, open position.

15. The apparatus of claim 14 wherein said piston is provided with means for engaging said jaws to pull said jaws back into the chamber in said housing when said piston is moved from said second position to said first position after securing the fastener around the two members and said jaws have returned to said first, open position under the influence of said bias means.

16. The apparatus of claim 15 wherein said jaws are provided with a shoulder, said engaging means bearing against said shoulder to pull said jaws back into the chamber in said housing.

17. A method of securing a first member to a second member comprising the steps of:
    loading a fastener into a pair of pivoting jaws each pivotally mounted about a pivot axis within a housing;
    moving the jaws, having the fastener loaded therein, out of the housing by moving a piston having a beveled shoulder formed therein for bearing against the jaws mounted within the housing from a first position to a second position engaging the jaws, the beveled shoulder causing the pivot point of the jaws to slide within the housing and move said jaws out of the housing;
    confining the jaws within the housing when the jaws are initially engaged by the piston and then allowing the jaws to swing outwardly through an opening in the housing under the influence of the beveled shoulder of the piston as the pivot point of the jaws slides to pivot the jaws out of the housing around a first and a second member to bend the fastener; and
    resiliently resisting movement of the fastener away from the first and second members to conform the fastener to the shape of the first and second members as the fastener bends to tightly secure the fastener around the first and second members by engaging the fastener with means separate from said jaws.

18. The method of claim 17 additionally comprising biasing the jaws back into the housing so that, as the piston is moved toward the first position, the beveled shoulder allows the jaws to return to the housing.

19. The method of claim 17 additionally comprising engaging the jaws with a shoulder formed in said piston to slide the pivot points of the jaws to return the jaws to the housing.

* * * * *